United States Patent
Kanai et al.

(10) Patent No.: US 9,366,945 B2
(45) Date of Patent: Jun. 14, 2016

(54) FLOAT AND FLOAT-INCLUDED CAMERA APPARATUS

(71) Applicants: SINTAI OPTICAL (SHENZHEN) CO., LTD., New Zone Shenzhen, Guandong Province (CN); ASIA OPTICAL CO., INC., Taichung (TW)

(72) Inventors: Kunihiko Kanai, Taichung (TW); Kentaro Hara, Taichung (TW)

(73) Assignees: SINTAI OPTICAL (SHENZHEN) CO., LTD., New Zone Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 14/805,537

(22) Filed: Jul. 22, 2015

(65) Prior Publication Data

US 2016/0026071 A1 Jan. 28, 2016

(51) Int. Cl.
*G03B 17/08* (2006.01)
*H01Q 1/22* (2006.01)
*H01Q 1/34* (2006.01)

(52) U.S. Cl.
CPC .......... *G03B 17/08* (2013.01); *H01Q 1/22* (2013.01); *H01Q 1/34* (2013.01)

(58) Field of Classification Search
CPC ........ G03B 17/08; G03B 17/561; H01Q 1/22; H01Q 1/34
See application file for complete search history.

(56) References Cited

U.S. PATENT DOCUMENTS

| | | | | |
|---|---|---|---|---|
| 3,827,069 | A * | 7/1974 | Stowell | G03B 17/08 396/144 |
| 5,287,133 | A * | 2/1994 | Bohley | E03F 7/12 346/33 P |
| 2004/0076415 | A1* | 4/2004 | Da Silva | G03B 17/08 396/25 |
| 2004/0208499 | A1* | 10/2004 | Grober | B63B 22/24 396/428 |
| 2005/0102883 | A1* | 5/2005 | Temes | A01K 93/00 43/26.1 |
| 2006/0216007 | A1* | 9/2006 | Moreb | A01K 97/00 396/25 |
| 2009/0318762 | A1* | 12/2009 | Segawa | A61B 1/00158 600/118 |
| 2011/0162252 | A1* | 7/2011 | Smith | A01K 87/007 43/4.5 |
| 2012/0315813 | A1* | 12/2012 | Rossini | B63B 22/00 441/1 |
| 2015/0236399 | A1* | 8/2015 | Lin | H01Q 1/22 343/720 |

* cited by examiner

*Primary Examiner* — WB Perkey
(74) *Attorney, Agent, or Firm* — McClure, Qualey & Rodack, LLP

(57) ABSTRACT

An embodiment of the invention provides a float capable of mounting a camera device including an antenna to enable underwater photography with less limitation to the arrangement of the antenna. The float includes a recess 3 acting as a first camera device mounting section at a side to be immersed in water. The first camera device mounting section is provided for mounting a first camera device 101. The float has buoyancy to provide a protruding section 5 protruding upwardly from water's surface A when the float is floating on the water's surface A in a state of mounting the first camera device 101 in the recess 3. The float, including the protruding section 5, between the protruding section 5 and an antenna 104 equipped on the first camera device 101 mounted in the recess 3 is composed of a material capable of transmitting a radio wave.

13 Claims, 14 Drawing Sheets

FLOAT AND FLOAT-INCLUDED CAMERA APPARATUS

CROSS REFERENCE TO RELATED APPLICATIONS

This Application claims priority of Japan Patent Application No. 2014151135, filed on Jul. 22, 2014, the entirety of which is incorporated by reference herein.

BACKGROUND OF THE INVENTION

1. Field of the Invention

The invention relates to floats and float-included camera apparatuses.

2. Description of the Related Art

In patent document 1, a configuration comprising a photography device (camera) in a section of a float (float part) that sinks underwater for enabling underwater photography is disclosed. The configuration is capable of performing communication between the photography device and the operator (the operator of the photography device) located on the water utilizing a radio wave. Therefore, in the configuration disclosed in patent document 1, the photography device is disposed in the water, while an antenna is disposed above the water's surface.

PRIOR ART(S)

[Patent Document 1] pre-grant publication JP2009196503

BRIEF SUMMARY OF THE INVENTION

Problems to be Solved by the Invention

Thus, it is necessary to dispose an antenna above the water's surface to perform communication between the photography device provided in the underwater sinking section of the float and an operator on the water utilizing a radio wave, and there is a problem wherein the arrangement of the antenna into the float is often limited.

Therefore, an embodiment of the invention provides a float capable of mounting a camera device comprising an antenna to enable underwater photography with less limitation to the arrangement of the antenna.

Means to Solve the Problems

An embodiment of the invention provides a float including a first camera device mounting section at a side to be immersed in water. The first camera device mounting section is provided for mounting a first camera device. The float has buoyancy to provide a protruding section protruding upwardly from water's surface when the float is floating on the water's surface in a state of mounting the first camera device in the first camera device mounting section. The float, including the protruding section, between the protruding section and an antenna equipped on the first camera device mounted in the first camera device mounting section is composed of a material capable of transmitting a radio wave.

In the float, it is preferred that a hole section penetrating from the first camera device mounting section to the exterior of the protruding section is formed.

In the float, it is preferred that the float further includes a tapering section at the float's side to be immersed in water, the tapering section tapering along a direction from top to bottom in a state of floating on the water's surface, and the first camera device mounting section is arranged at a position including the bottom end of the tapering section.

In the float, it is preferred that a reflex angle of an apex angle formed by side surfaces of the tapering section is equal to or greater than the angle of view of the first camera device.

In the float, it is preferred that the first camera device mounting section is a recess recessing upwardly from a bottom surface of the float, and the first camera device is held in the recess.

In the float, it is preferred that the float further includes a center of gravity shifting mechanism capable of moving a weight between a center side and an outside of the float.

In the float, it is preferred that the float has a shape that is symmetrical between the top and bottom of the float when floating on the water's surface, the float further includes a second camera device mounting section at the top of the float, and the second camera device mounting section is provided for mounting a second camera device.

An embodiment of the invention provides a float-included camera apparatus utilizing one of the described floats as a float thereof.

An embodiment of the invention provides a camera apparatus including a float and a camera device. The float is capable of floating on water's surface. The float has a protruding section on the water's surface and an immersed section under the water's surface. The immersed section includes a storage space. The camera device includes a lens received in the storage space and an antenna equipped inside the camera device relatively to the lens. The antenna is close to the water's surface, and the camera apparatus is capable of performing underwater communication.

In the camera apparatus, it is preferred that the protruding section and a portion between the antenna and the protruding section are composed of a material capable of transmitting radio waves.

In the camera apparatus, it is preferred that lines extending from the antenna respectively upwardly to waterline positions at vertical surfaces at either side of the float form an angle ($\theta$). It is also preferred that the antenna is capable of sending and receiving the radio waves inside an angular range of the angle ($\theta$) ranging as $0<\theta<180$ degrees. It is also preferred that the angle ($\theta$) increases when a lateral diameter of the float or a reciprocal of a vertical distance from the antenna upwardly to the water's surface increases.

In the camera apparatus, it is preferred that a hole section penetrating from the immersed section to an exterior of the protruding section is formed in the float.

In the camera apparatus, it is preferred that the float includes a tapering section below the water's surface, and the tapering section tapers along a direction from top to bottom while floating on the water's surface. It is also preferred that the immersed section is arranged at a position including a lower end of the tapering section.

In the camera apparatus, it is preferred that a reflex angle of an apex angle formed by side surfaces of the tapering section is equal to or greater than an angle of view of the camera device.

In the camera apparatus, it is preferred that a center of gravity shifting mechanism capable of moving a weight between a center side and an outside of the float.

In the camera apparatus, it is preferred that float has a shape that is symmetrical between top and bottom of the float. It is also preferred that the float further includes a second storage space at top of the float. It is also preferred that the storage space is provided for mounting a second lens.

An embodiment of the invention provides a float-included camera apparatus utilizing one of the described floats as a float thereof.

An embodiment of the invention provides a float-included camera apparatus, including a float, a camera device and an antenna. The camera device is equipped with a first camera lens at a side to be immersed in water at an outer side of the float. The antenna is disposed in the float to perform communication between the exterior of the float and the camera device. The float provides buoyancy to provide a protruding section protruding upwardly from water's surface when the float is floating on the water's surface. The float between the protruding section and the antenna is composed of a material capable of transmitting a radio wave.

In the apparatus, it is preferred that the camera device further includes a second camera lens at a side of the protruding section at an outer side of the float, and the float has a shape that is symmetrical between the top and bottom of the float when the float is floating on the water's surface.

Effects of the Invention

According to invention, it is possible to provide a float capable of mounting a camera device comprising an antenna to enable underwater photography with less limitation to the arrangement of the antenna.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
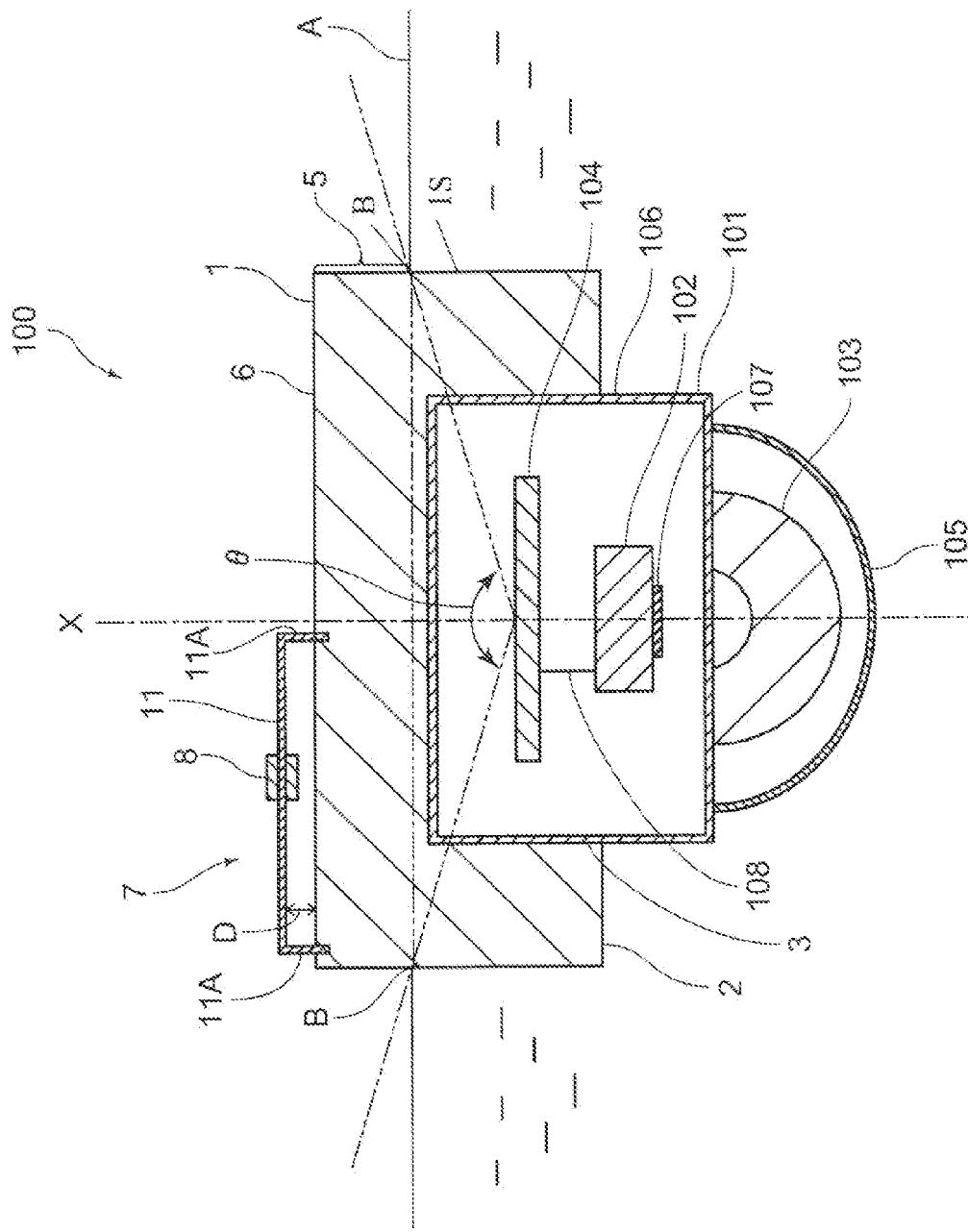
FIG. 1 shows a state of floating a float-included camera apparatus according to a first embodiment of the invention on the water's surface, schematically showing a cross-sectional configuration of a cross-section comprising a photographing optical axis.

The following description is of the best-contemplated mode of carrying out the invention. This description is made for the purpose of illustrating the general principles of the invention and should not be taken in a limiting sense. The scope of the invention is best determined by reference to the appended claims.

Note that the concepts and specific practice modes of the invention are described in detail by the embodiments and the attached drawings. In the drawings or description, similar elements are indicated by similar reference numerals and/or letters. Furthermore, the element shape or thickness in the drawings can be expanded for simplification or convenience of indication. Moreover, elements which are not shown or described can be, in every form, known by those skilled in the art.

It is understood that the following disclosure provides many different embodiments, or examples, for implementing different features of the invention. Specific examples of components and arrangements are described below to simplify the present disclosure. These are merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples.

Specific embodiments of the invention for floats and float-included camera apparatuses are described. It should be noted that the concepts of the invention can be applied to any known or newly developed floats and float-included camera apparatuses.

First Embodiment

The configurations of a float 1 according to a first embodiment of the invention and a float-included camera apparatus 100 comprising the float 1 are described with reference to FIGS. 1 to 3.

Overall Configuration of the Float 1 and the Float-Included Camera Apparatus 100

FIG. 1 shows a state of floating the float-included camera apparatus 100 on the water's surface A, schematically showing a cross-sectional configuration of a cross-section comprising a photographing optical axis X. As shown in FIG. 1, the float-included camera apparatus 100 comprises the float 1 and a camera device 101. In the following descriptions, the spatially relative terms, such as "upward(ly)" ("top", "above", "upper") and "downward(ly)" ("bottom", "under", "lower"), are based on the upward or downward direction when floating the float-included camera apparatus 100 on the water's surface A.

Figure 2:
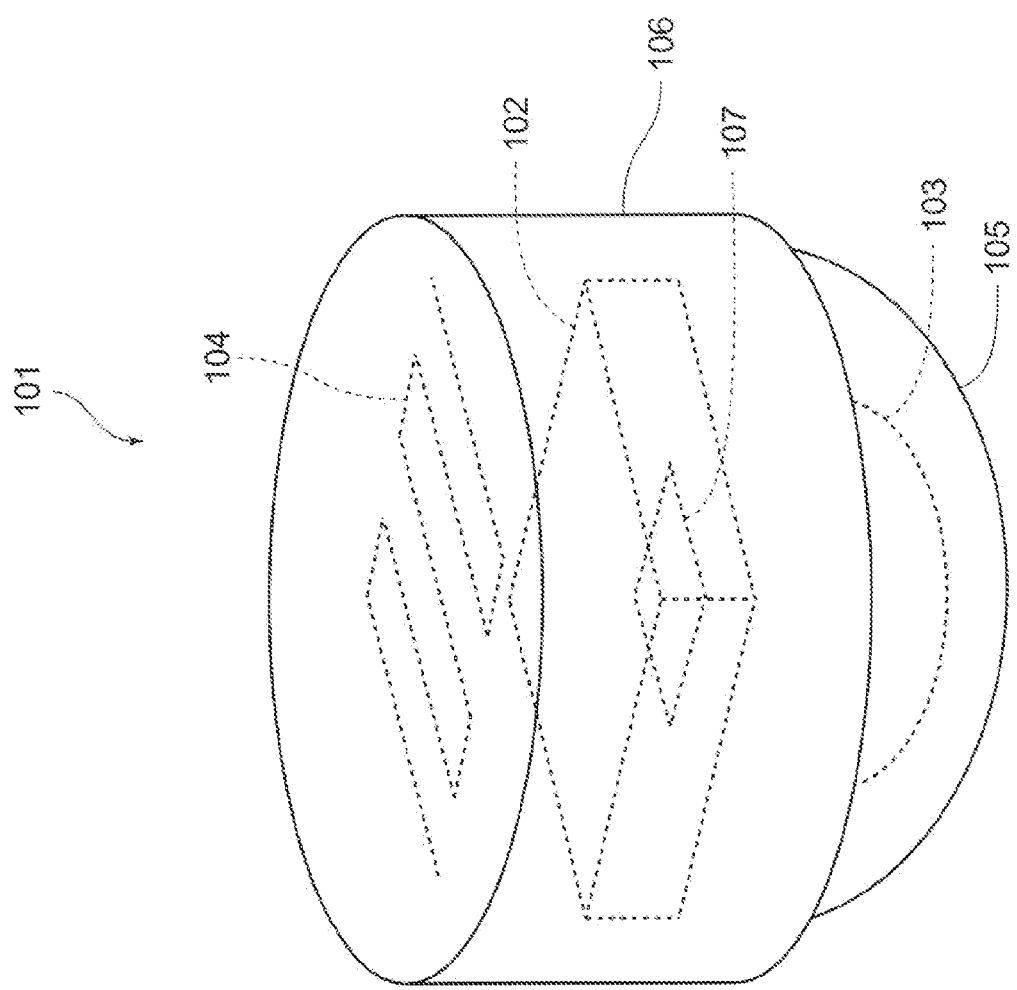
FIG. 2 is a perspective view schematically showing a configuration when viewing the camera device shown in FIG. 1 obliquely from above, and showing a state of removing the float from the float-included camera apparatus.

FIG. 2 is a perspective view schematically showing a configuration when viewing the camera device 101 obliquely from above, and showing a state of removing the float 1 from the float-included camera apparatus 100. FIG. 3 is a perspective view schematically showing a configuration when viewing the float 1 obliquely from above, and showing a state of removing the camera device 101 from the float-included camera apparatus 101.

As shown in FIGS. 1 and 2, the camera device 101 includes a circuit component 102, a camera lens 103, an antenna 104, a transparent cover 105, and a housing 106, and so forth. The circuit component 102, the camera lens 103, and the antenna 104 are received in the transparent cover 105 and the housing 106. The transparent cover 105 provides a storage space for mounting or receiving the camera lens 103. The transparent cover 105 and the housing 106 are configured to be watertight for preventing water from penetrating into the interior thereof, and the camera device 101 is configured as a so-called waterproof camera. The appearance of the housing 106 overall exhibits a cylindrical structure.

The circuit component 102 has an imaging element 107 and can operate the camera device 101 having the imaging element 107 and control the operation of the camera device 101. The imaging element 107, for example, may use CCD (Charge Coupled Device), COMS (Complementary Metal-Oxide semiconductor), and so forth. Within the housing 106, a power source (battery) not shown in FIGS. 1 and 2 is provided, and the circuit component 102 is driven by the power source.

A subject light incident from the camera lens 103 is imaged by the imaging element 107. The circuit component 102 can communicate with an operation device, disposed at a location spaced apart from the camera device 101 and not shown in FIGS. 1 and 2, by a radio wave through the antenna 104. That is, the circuit component 102 can send photographed images, photograph information, etc. to the operation device through the antenna 104, and can receive information such as operating instructions from the operation device through the antenna 104. In addition to dedicated computers, generic portable terminals can be utilized as the operation device. The circuit component 102 and the antenna 104 are coupled by a communication line 108.

The camera lens 103 can image subject light from the exterior of the housing 106 in the imaging element 107 of the circuit component 102 provided in the housing 106.

The transparent cover 105 is formed by a transparent resin, and the subject light passes through the transparent cover 105 and incident to the camera lens 103. A coupling section between the transparent cover 105 and the housing 106 is watertight, and water does not penetrate into the interior of the transparent cover 105. That is, it is possible to prevent water from penetrating from mounting sections of the camera lens 103 and the housing 106 into the interior of the housing 106 with the transparent cover 105 provided.

The antenna 104 may utilize a loop antenna expanded on a plane, for example. The housing 106 is formed of resins such as PET (polyethylene terephthalate) to be capable of transmitting a radio wave. Therefore, it is possible for the antenna 104 received in the housing 106 to operate sending and receiving radio waves with the exterior of the housing 106.

Figure 3:
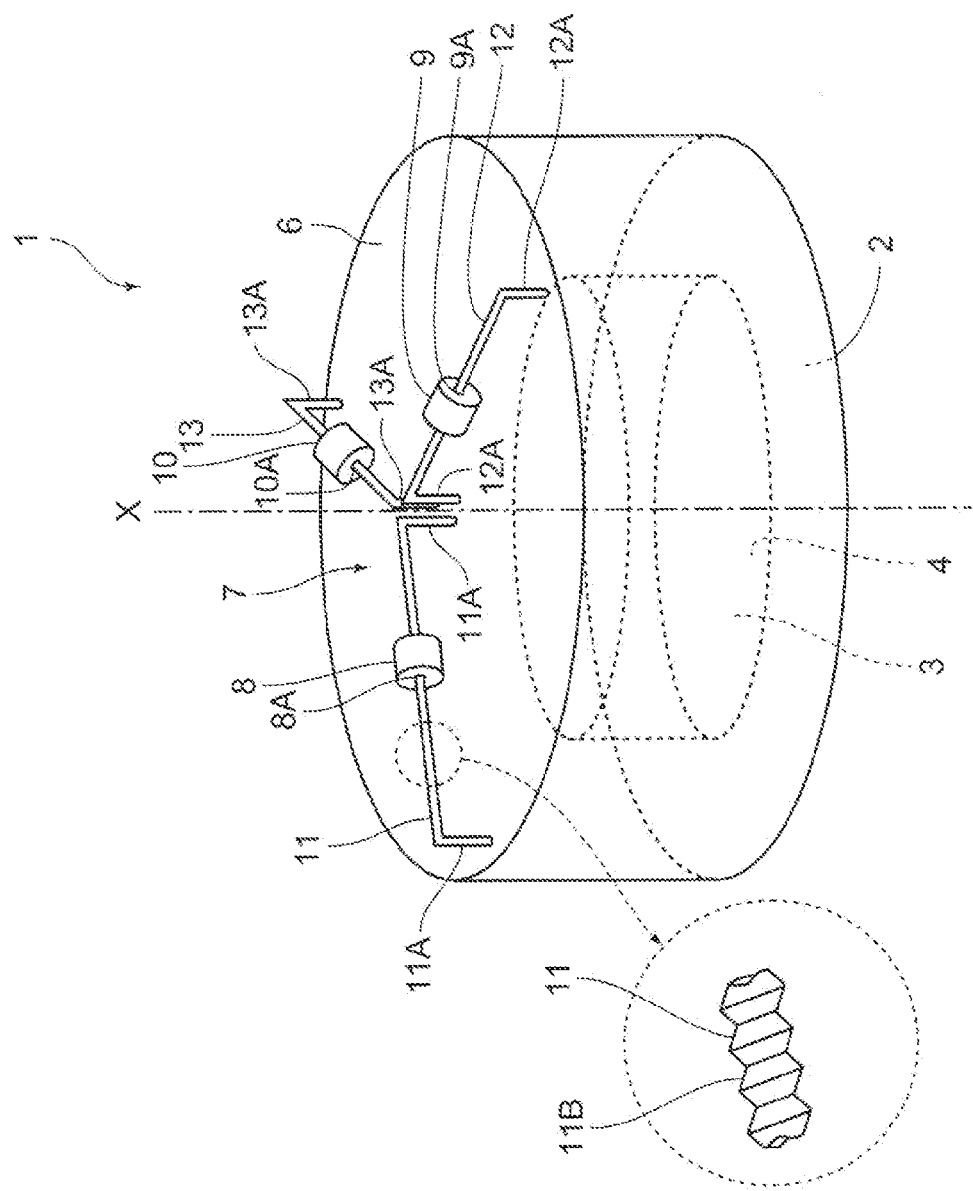
FIG. 3 is a perspective view schematically showing a configuration when viewing the float shown in FIG. 1 obliquely from above, and showing a state of removing the camera device from the float-included camera apparatus.

As shown in FIGS. 1 and 3, the float 1 overall exhibits a cylindrical object, and a recess 3 acting as a camera device mounting section is formed at a bottom surface 2 acting as an undersurface of the float 1. The float 1 is solid except for the parts of the recess 3, and is formed of foamed polystyrene (styrofoam), for example, acting as a material capable of transmitting a radio wave. It is also possible to form the float 1 utilizing resins capable of transmitting a radio wave such as polyurethane resins or acrylic resins, for example.

The recess 3 has an opening section 4 at the bottom surface 2 becoming an immersed side (sinked side) when floating the float-included camera apparatus 100, and is the recess recessing upwardly from the bottom surface 2. The recess 3 exhibits a shape capable of embedding the housing 106 of the camera device 101. The camera device 101 is embedded into the recess 3 with the camera lens 103 facing downwardly, and is mounted in a state of being held in the recess 3. The shapes, sizes, etc. of the housing 106 and the recess 3 relative to each other are set to embed the housing 106 into the recess 3 in a press-fitting state such that the camera device 101 does not fall down from the recess 3.

The shape, diameter, thickness, material, etc. of the float 1 are set to have buoyancy to provide a protruding section 5 protruding upwardly from water's surface A in a state of mounting the camera device 101, as shown in FIG. 1.

As described, the float 1 has the recess 3 acting as the camera device mounting section to mount the camera device 101 at the bottom surface 2. The bottom surface 2 is located at the lower side of the float 1 and immersed under water when the float-included camera apparatus 100 is floating on the water. That is, the recess 3 is disposed at the immersed side of the float 1. Furthermore, the float 1 has buoyancy to provide the protruding section 5 protruding upwardly from water's surface A when the float 1 is floating on the water in the state mounting the camera device 101 in the recess 3. Moreover, the float 1, including the protruding section 5, is overall formed of foamed polystyrene, and it is possible to transmit a radio wave between the protruding section 5 and the antenna 104 of the camera device 101 mounted in the recess 3.

The float-included camera apparatus 100 configured as described above provides the protruding section 5 protruding upwardly from the water's surface A when floating on the water. Thus, the radio waves radiated from the antenna 104 radiate to above the water through the protruding section 5, and further it is possible to send the radio waves radiated from an operation device (not shown) above the water to the antenna 104 through the protruding section 5 even when the antenna 104 is located under the water's surface A. Therefore, it is unnecessary for the float-included camera apparatus 100 to be equipped with the antenna 104 above the water's surface A. That is, the float 1 can decrease the limitations to the arrangement of the antenna 104.

The float 1 configured as described above can send radio waves to and receive radio waves from above the water's surface A even if the antenna 104 is disposed under the water's surface A. Therefore, it is possible to dispose the antenna 104 under the water's surface A, and it is possible to decrease the height of the camera device 101. Thus, the float-included camera apparatus 100 can be configured to lower the center of gravity thereof, and can stabilize a position against waves when floating on the water's surface A.

The antenna 104 makes it easy to send and receive radio waves inside (at an interior side of) an angular range of an angle θ formed by lines extending from the antenna 104 respectively upwardly to waterline positions B at vertical surfaces 1S at either side of the float 1. On the other hand, it is difficult to send and receive radio waves outside (at the exterior of) the angular range of the angle θ due to water presenting at the path from the antenna 104 to above the water's surface A. Therefore, it is possible to set the angle θ to be the desired value by means of properly setting the horizontal size of the float 1 (the diameter of the float 1), the position of the antenna 104 relative to the water's surface A along a direction that is upward, downward, etc. The angle θ is set to be easy for the communication of the camera device 101 and the operation device (not shown).

In one embodiment, the antenna 104 is capable of sending and receiving the radio waves inside the angular range of the angle θ ranging as 0<θ<180 degrees. The angle θ increases when a lateral diameter of the float or a reciprocal of a vertical distance from the antenna upwardly to the water's surface increases.

The recess 3 is the recess recessing upwardly from the bottom surface 2. Thus, it is possible to dispose the antenna 104 disposed in the camera device 101 at an upper position when holding (mounting) the camera device 101 in the recess 3. As a result, it is possible to expand the angle θ to expand the range able to send the radio waves to and receive the radio waves from above the water's surface A of the antenna 104.

The recess 3 is the recess formed on an outside surface of the float 1. Therefore, the mounting operation of the camera device 101 into the float 1 is a simple operation, to embed the camera device 101 from the exterior of the float 1 into the recess 3. Moreover, the camera device 101 is a waterproof camera. Thus, it is unnecessary to provide waterproof configurations against the camera device 101 at the side of the float 1. That is, by means of setting the camera device 101 to be the waterproof camera, and setting the camera device mounting section to be the recess 3 recessing from outside to inside of the float 1, it is possible to simplify the mounting operation of the camera device 101 into the float 1. Furthermore, the removing operation of the camera device 101 from the float 1 also becomes easy.

A center of gravity shifting mechanism 7 is provided at a top surface 6 of the float 1. The center of gravity shifting mechanism 7 comprises weights 8, 9 and 10, and guides 11, 12 and 13 supporting the weights 8, 9 and 10 in states that the weights 8, 9 and 10 are movable. The weight 8 is discussed as an example because the weights 8, 9 and 10 have the same shape. Furthermore, the guide 11 is also discussed as an example because the guides 11, 12 and 13 have the same shape.

The guide 11 has supporting sections 11A, 11A bending downwardly at its two ends. The supporting sections 11A, 11A are fastened to the float 1 by a method such as insertion to the top surface 6. The supporting sections 11A, 11A set a space D (referring to FIG. 1) between the guide 11 and the top surface 6 in states fastened to the float 1 to be able to move the weight 8 along the guide 11 without interference from the weight 8 and the top surface 6.

A screw thread 11B (referring to FIG. 3) is threaded on the periphery of the guide 11. Furthermore, the weight 8 is formed to have a threaded hole 8A where the guide 11 is inserted, wherein the threaded hole 8A can screw and engage with the screw thread 11B. Therefore, the weight 8 can be led by the screw thread 11B and is movable along the guide 11 by means of rotating the weight 8 on the periphery of the guide 11.

The guides 11, 12 and 13 are disposed radially at equal angles (120-degree intervals) using the photographing optical axis X as a center. Therefore, the weights 8, 9 and 10 provided to be movable along the guides 11, 12 and 13 are movable between a center side (photographing optical axis X side) and an outside (a direction apart from the photographing optical axis X) of the float. Then, it is possible to adjust the center of gravity of the float-included camera apparatus 100 by means of properly shifting the positions of the weights 8, 9 and 10.

When the center of gravity of the float-included camera apparatus 100 is not located on the photographing optical axis X, the float-included camera apparatus 100 will tilt, and the photographing optical axis X will tilt relative to a vertical line. At this time, it is possible to coincide the photographing optical axis X with the vertical line by means of moving the weights 8, 9 and 10 along the respective guides to dispose the center of gravity of the float-included camera apparatus 100 on the photographing optical axis X.

On the contrary, when it is desired to tilt the photographing optical axis X relative to the vertical line, the positions of weights 8, 9 and 10 are adjusted to offset (shift) the center of gravity of the float-included camera apparatus 100 from the photographing optical axis X. It is possible to tilt the position of the float-included camera apparatus 100 and to tilt the photographing optical axis X relative to the vertical line by means of offsetting (shifting) the center of gravity of the float-included camera apparatus 100 from the photographing optical axis X. As a result, it is possible to photograph a range deviating to a direction of the photographing optical axis X relative to the vertical line.

Figure 4:
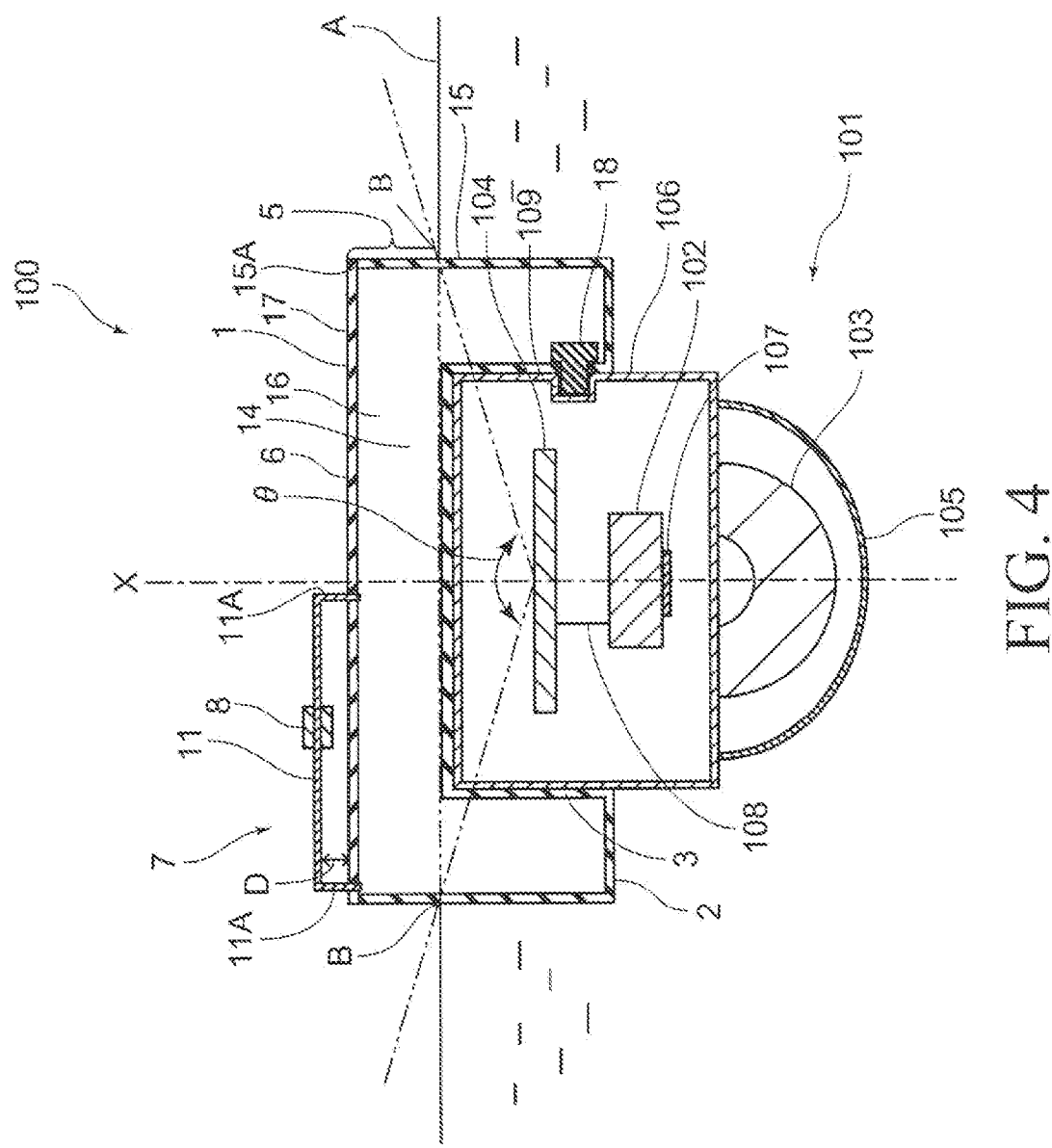
FIG. 4 shows of a modified example of the float and the float-included camera apparatus according to the first embodiment.

Modified Example of the Float 1 and the
Float-Included Camera Apparatus 100 According to
the First Embodiment FIG. 4 shows a modified example of the float 1 and the float-included camera apparatus 100 according to the first embodiment. The elements that are the same as or similar to the float 1 and the float-included camera apparatus 100 are indicated by the same or similar reference numerals and/or letters, and their descriptions are omitted or simplified.

Compared to the previously described float 1 with solid configurations, the float 1 shown in FIG. 4 is configured to have a hollow section 14. An interior of a shell wall 15 is formed to be the hollow section 14. An opening section 16 is formed above the shell wall 15, and the opening section 16 is closed by a cover body 17. The shell wall 15 and the cover body 17 are formed of a material capable of transmitting a radio wave, such as PET, acrylic resins, etc. The camera device 101 embedded and mounted in the recess 3 is fastened by a screw 18 piercing the shell wall 15 from the interior of the hollow section 14 of the float 1 to the side of the recess 3. A screw hole 109 where the screw 18 screws in is formed in the housing 106 of the camera device 101. Furthermore, the camera device 101 may also be configured by press-fitting into the recess 3.

The cover body 17 is fastened to an upper edge 15A of the shell wall 15 by a fastening means such as a snap lock omitted from those shown in drawings. Furthermore, a waterproof packing omitted from those shown in drawings is provided in a contact section of the cover body 17 and the upper edge 15A, and it is possible to prevent water from penetrating into the hollow section 14 from the opening section 16 when the cover body 17 is fastened to the shell wall 15 by the fastening means.

Compared to the solid float 1, there is air in the hollow section 14, and therefore it is easier to transmit radio waves and increase the buoyancy of the float 1. Furthermore, by means of removing the cover body 17 from the shell wall 15, an operator of the float-included camera apparatus 100 can access the interior of the hollow section 14 from the opening section 16, and can perform the attachment and detachment of the screw 18.

Second Embodiment

Next, configurations of a float 20 and a float-included camera apparatus 200 according to the second embodiment of the invention are described with reference to FIGS. 5 and 6. In the subsequent descriptions, elements that are the same as or similar to the float 1 and the float-included camera apparatus 100 according to the first embodiment are indicated by the same or similar reference numerals and/or letters, and their descriptions are omitted or simplified.

Figure 5:
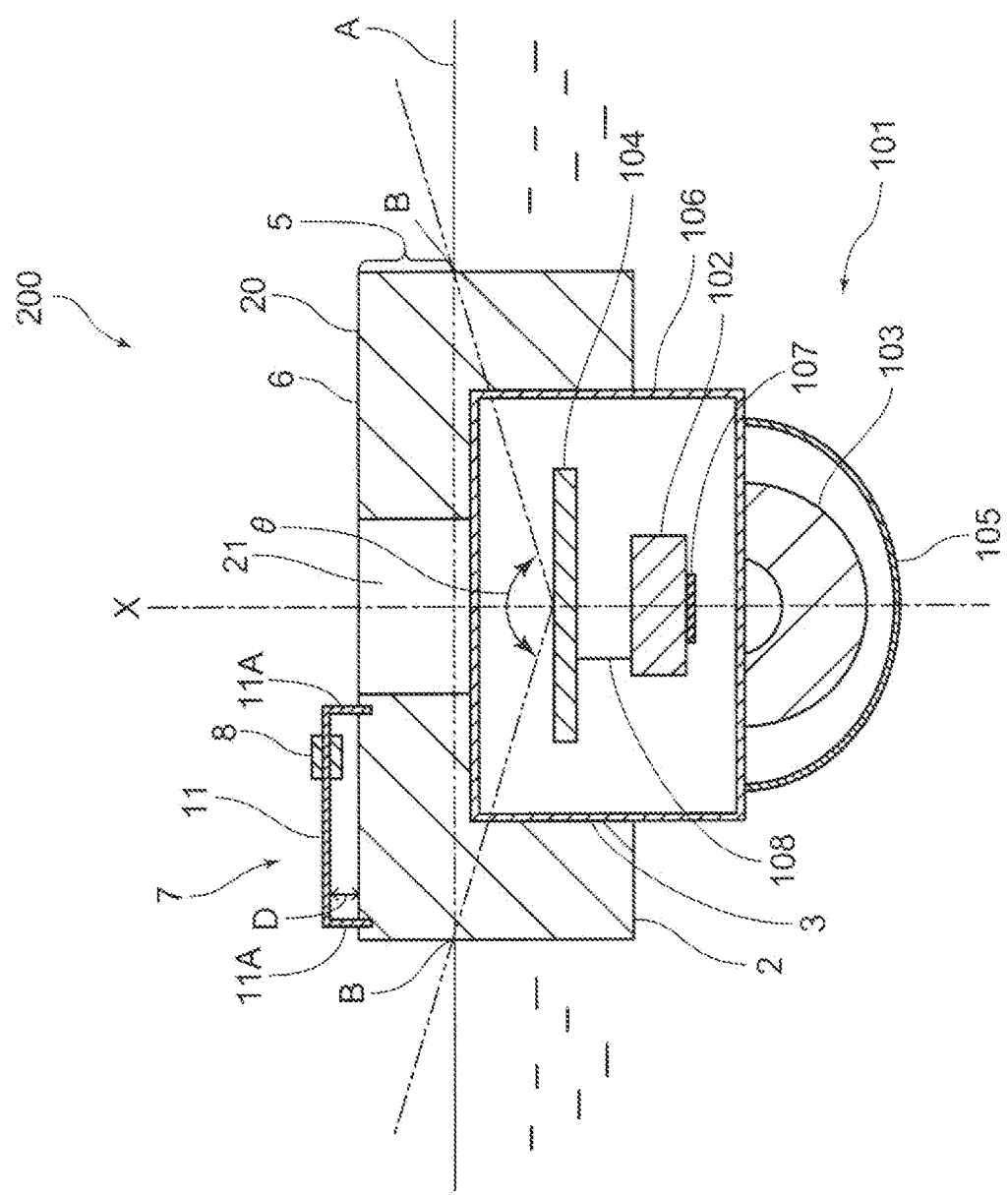
FIG. 5 shows a state of floating a float-included camera apparatus according to a second embodiment of the invention on the water's surface, schematically showing a cross-sectional configuration of a cross-section comprising a photographing optical axis.
Figure 6:
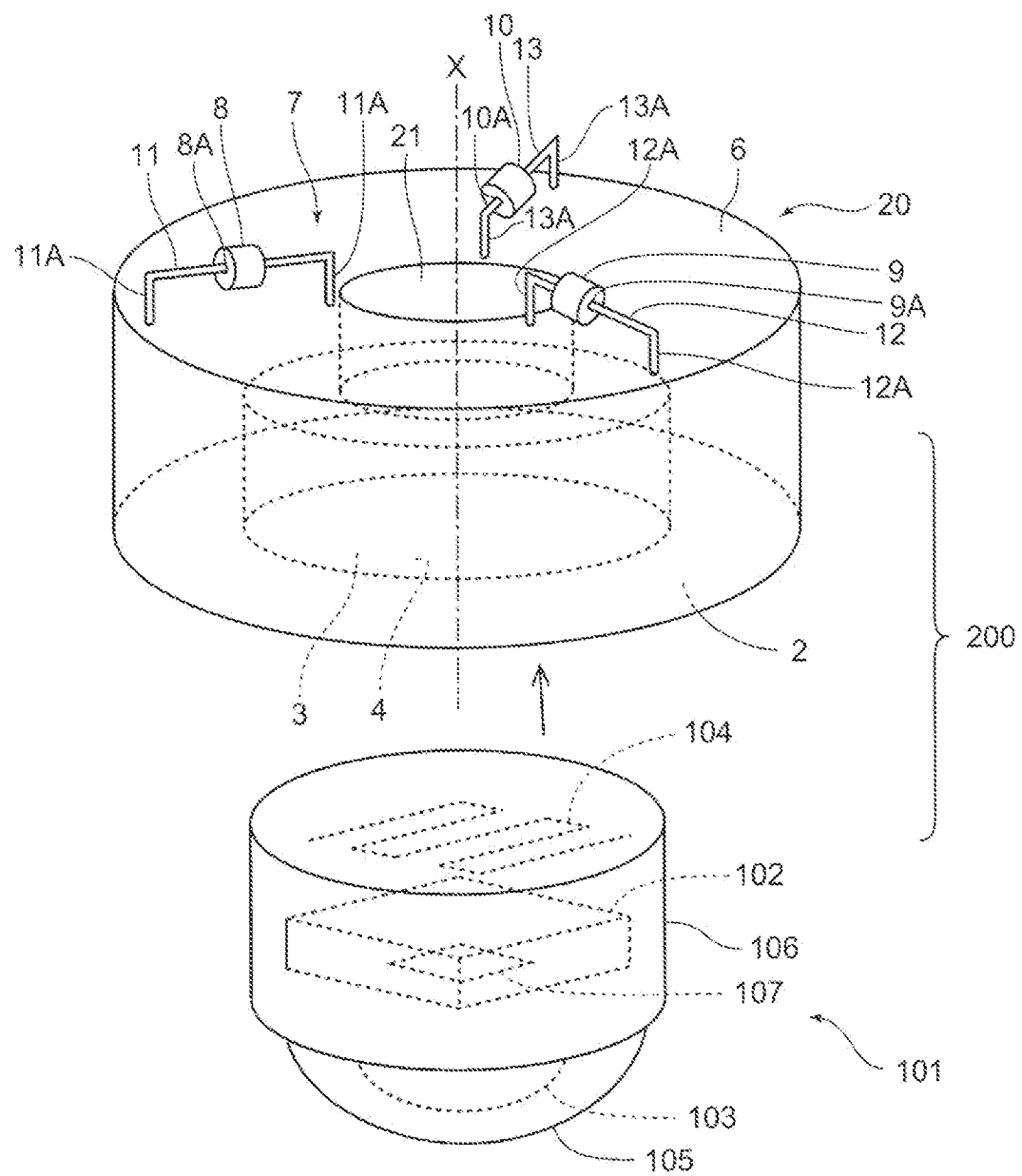
FIG. 6 is a perspective view from viewing the float and the camera device obliquely from above before embedding the camera device to the float shown in FIG. 5.

FIG. 5 shows a state of floating the float-included camera apparatus 200 on the water's surface A, schematically showing a cross-sectional configuration of a cross-section comprising a photographing optical axis X. FIG. 6 is a perspective view from viewing the float 20 and the camera device 101 obliquely from above before embedding the camera device 101 to the float 20.

The float 20 has a hole section 21 through the recess 3 and the top surface 6. The hole section 21 pierces from the recess 3 acting as the camera device mounting section to the top surface 6 which is on the exterior of the protruding section 5. There is air in the hole section 21. Compared to foamed polystyrene, air can more easily transmit radio waves. Therefore, Compared to the situation of filling resins such as foamed polystyrene in the interior of the float 1 as described above for the float 1, it is easier to send the radio to and receive the radio waves from above the water's surface A due to the provision of the hole section 21.

Third Embodiment

Configurations of a float 30 and a float-included camera apparatus 300 according to the third embodiment of the invention are described with reference to FIGS. 7 and 8. In the subsequent descriptions, elements that are the same as or similar to the float 1 and the float-included camera apparatus 100 according to the first embodiment are indicated by the same or similar reference numerals and/or letters, and their descriptions are omitted or simplified.

Figure 7:
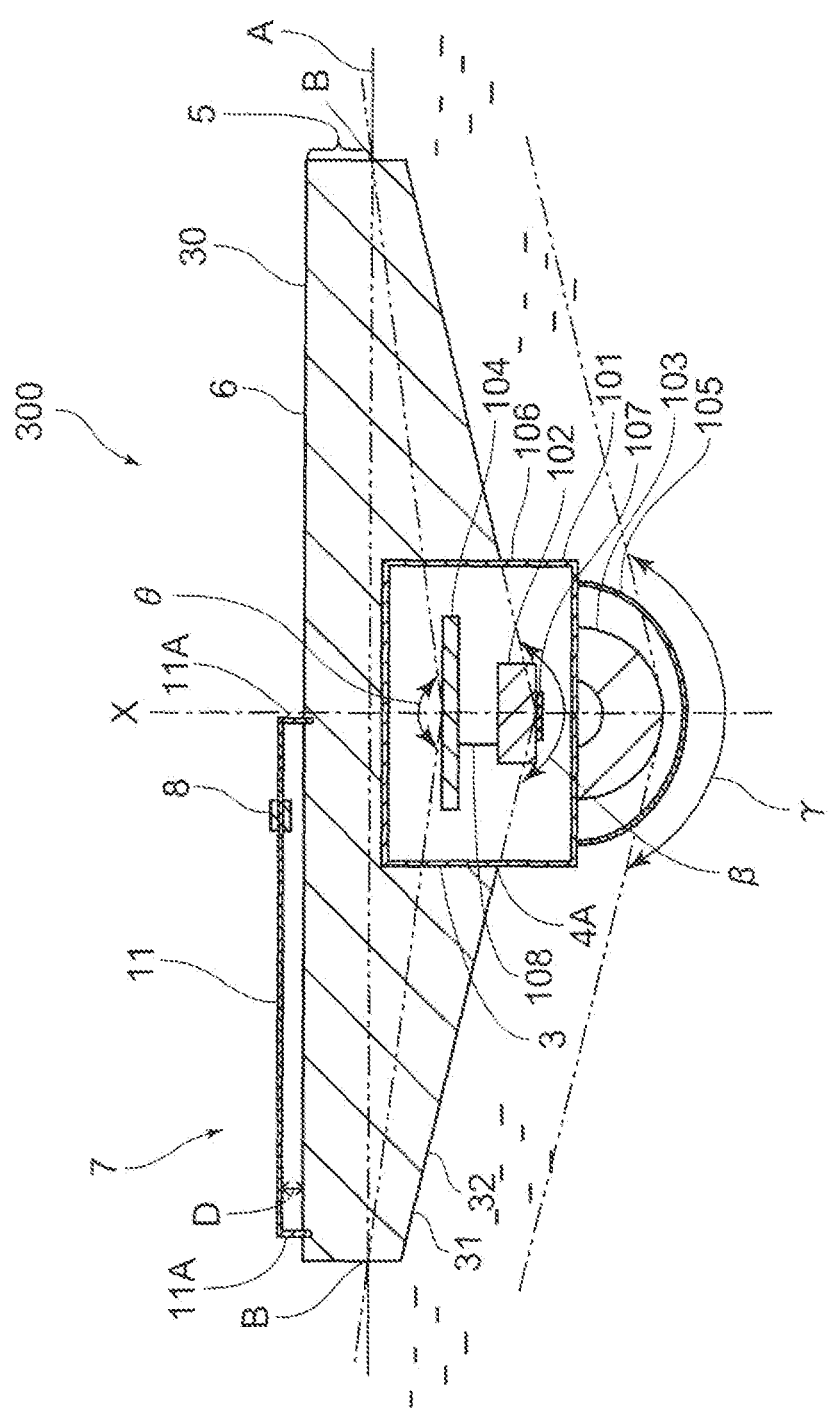
FIG. 7 shows a state of floating a float-included camera apparatus according to a third embodiment of the invention on the water's surface, schematically showing a cross-sectional configuration of a cross-section comprising a photographing optical axis.
Figure 8:
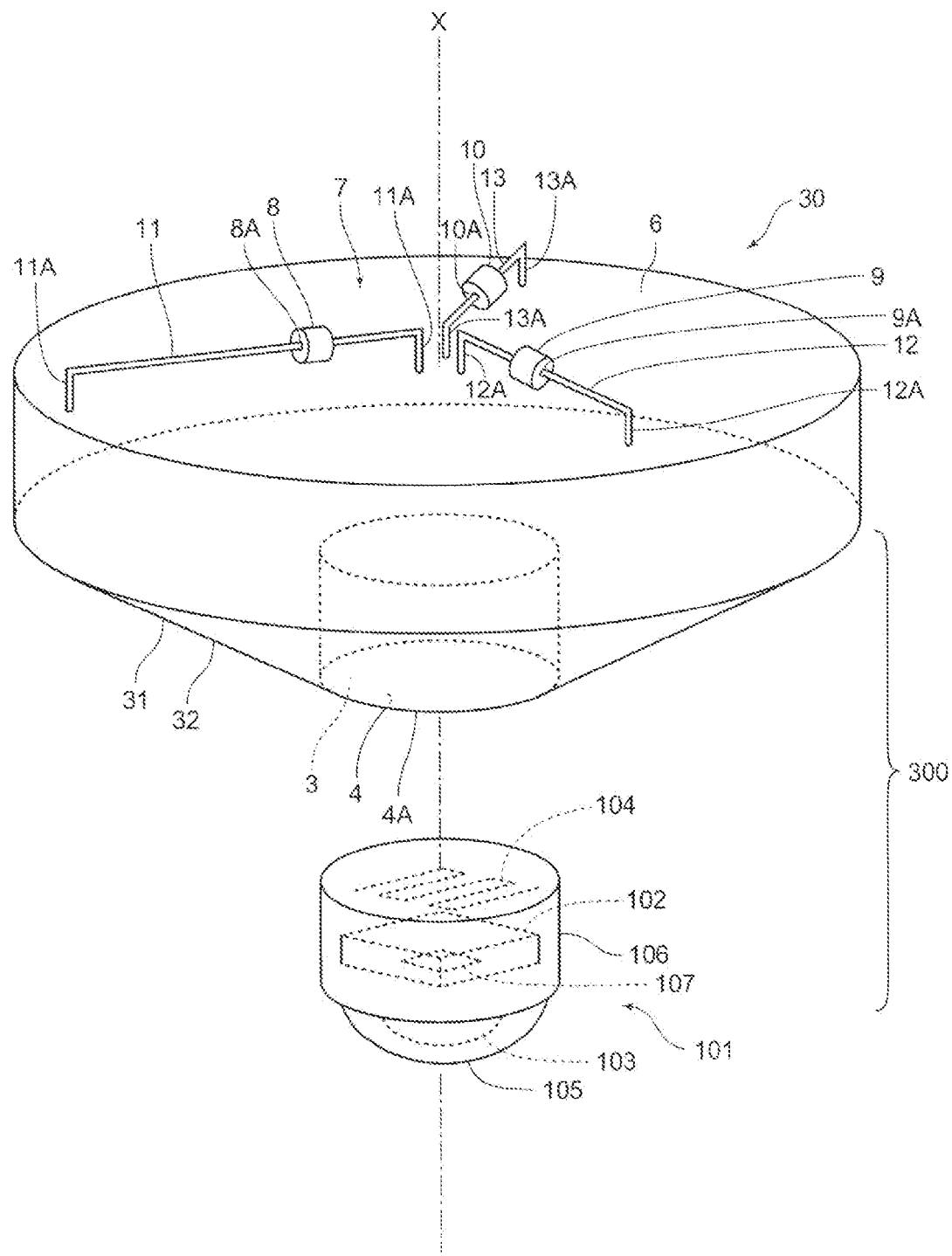
FIG. 8 is a perspective view from viewing the float and the camera device obliquely from above before embedding the camera device to the float shown in FIG. 7.
Figure 9:
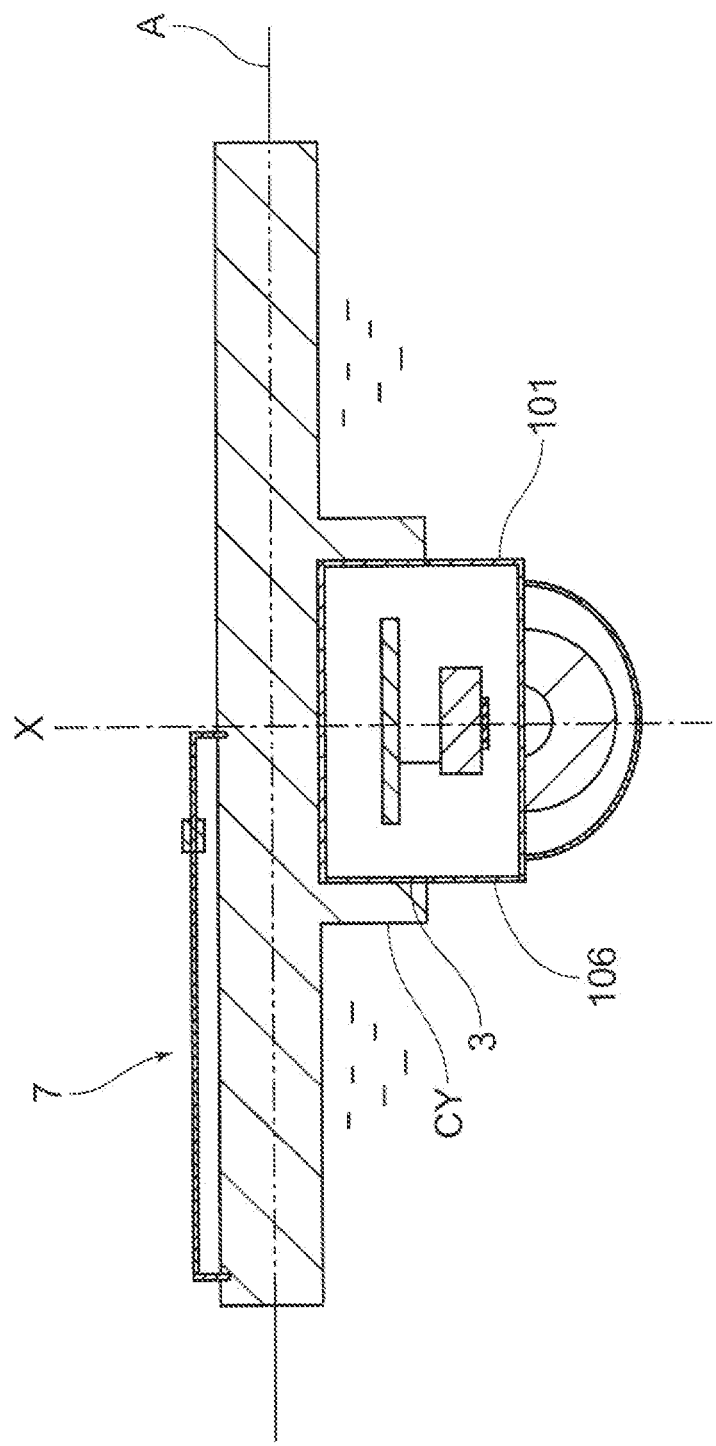
FIG. 9 shows a comparison example for comparing with the floats according to the invention.

FIG. 7 shows a state of floating the float-included camera apparatus 300 on the water's surface A, schematically showing a cross-sectional configuration of a cross-section comprising the photographing optical axis X. FIG. 8 is a perspective view from viewing the float 30 and the camera device 101 obliquely from above before embedding the camera device 101 to the float 30.

The float 30 has a cone body 31 (tapering section as claimed) acting as a tapering section at the side to be immersed underwater. The cone body 31 exhibits a shape becoming wider from bottom to top. That is, areas of transverse sections of the cone body 31 gradually decrease from top to bottom. Furthermore, a recess 3 is formed at a position comprising a lower end (tip) of the cone body 31. The cone body 31 is a shape that is symmetrical relative to the photographing optical axis X. Furthermore, a conical surface (side surface as claimed) 32 of the cone body 31 acting as the bottom surface of the float 30 is a sloped surface tilting upwardly along a direction from the photographing optical axis X to outside.

Comparing the shape of the float 30 to the situation setting a thickness along the upward or downward direction to provide a disk shape with a thickness around a periphery section 4A, the float 30 has smaller volume and provides smaller buoyancy. Furthermore, the recess 3 is disposed at the position comprising the lower end which is the lowest of the cone body 31. Thus, it is possible to increase the depth of the camera device 101 in the water when floating the float-included camera apparatus 100 on the water's surface A.

Compared to the configuration of the float 30, it is also possible to increase the depth of the camera device 101 in the water when forming a recess 3 in a cylinder section CY extending downwardly and mounting the camera device 101 in the recess 3. However, the radio wave sending and receiving range of the antenna 104 is limited by the water present outside the cylinder section CY, and therefore potentially becomes narrower when setting the configuration. Compared thereto, it is possible to perform the expansion of the radio wave sending and receiving range of the antenna 104 due to providing the cone body 31, forming the recess 3 at the tip of the cone body 31 and mounting the camera device 101 in the recess.

The ratio of the horizontal size of the float 30 to the wavelength of the wave of the water's surface A increases due to the increase of the horizontal size, namely the diameter of the float 30, thereby decreasing the pitching of the float-included camera apparatus 300 due to the wave. However, in a situation in which the angle γ (referring to FIG. 7) of view of the camera device 101 exceeds 180 degrees, vignetting can easily take place due to the subject light being blocked by the float 30 if the horizontal size of the float 30 increases. Therefore, it is possible to decrease the vignetting quantity of the subject light even when the angle of view exceeds 180 degrees due to setting the immersed side of the float 30 to be the cone body 31 and setting the bottom side of the float 30 to be the conical surface 32 (the sloped surface tilting upwardly along the direction from the photographing optical axis X to outside).

It is preferred that a reflex angle β (referring to FIG. 7) of an apex angle formed by the conical surface 32 of the cone body 31 is equal to or greater than the angle γ of view. When setting the reflex angle β equal to or greater than the angle γ of view, the vignetting due to the subject light being blocked by the conical surface 32 can be prevented in spite of the horizontal size of the float 30. Furthermore, it is also possible to form a hole section equivalent to the hole section 21 of the float 20 according to the second embodiment shown in FIGS. 5 and 6, and the hole section pierces from the recess 3 to the exterior of the protruding section 5. Compared to the situation related to filling resins such as foamed polystyrene in the interior of the float 30, it is easier to send the radio waves to and receive the radio waves from above the water's surface A due to the provision of the hole section.

The recess 3 is the recess recessing upwardly from the conical surface 32 acting as the bottom surface of the float 30. Thus, it is possible to dispose the antenna 104 disposed in the camera device 101 at an upper position when holding (mounting) the camera device 101 in the recess 3. As a result, it is possible to expand the angle θ to expand the range able to send the radio waves to and receive the radio waves from above the water's surface A of the antenna 104.

Figure 10:
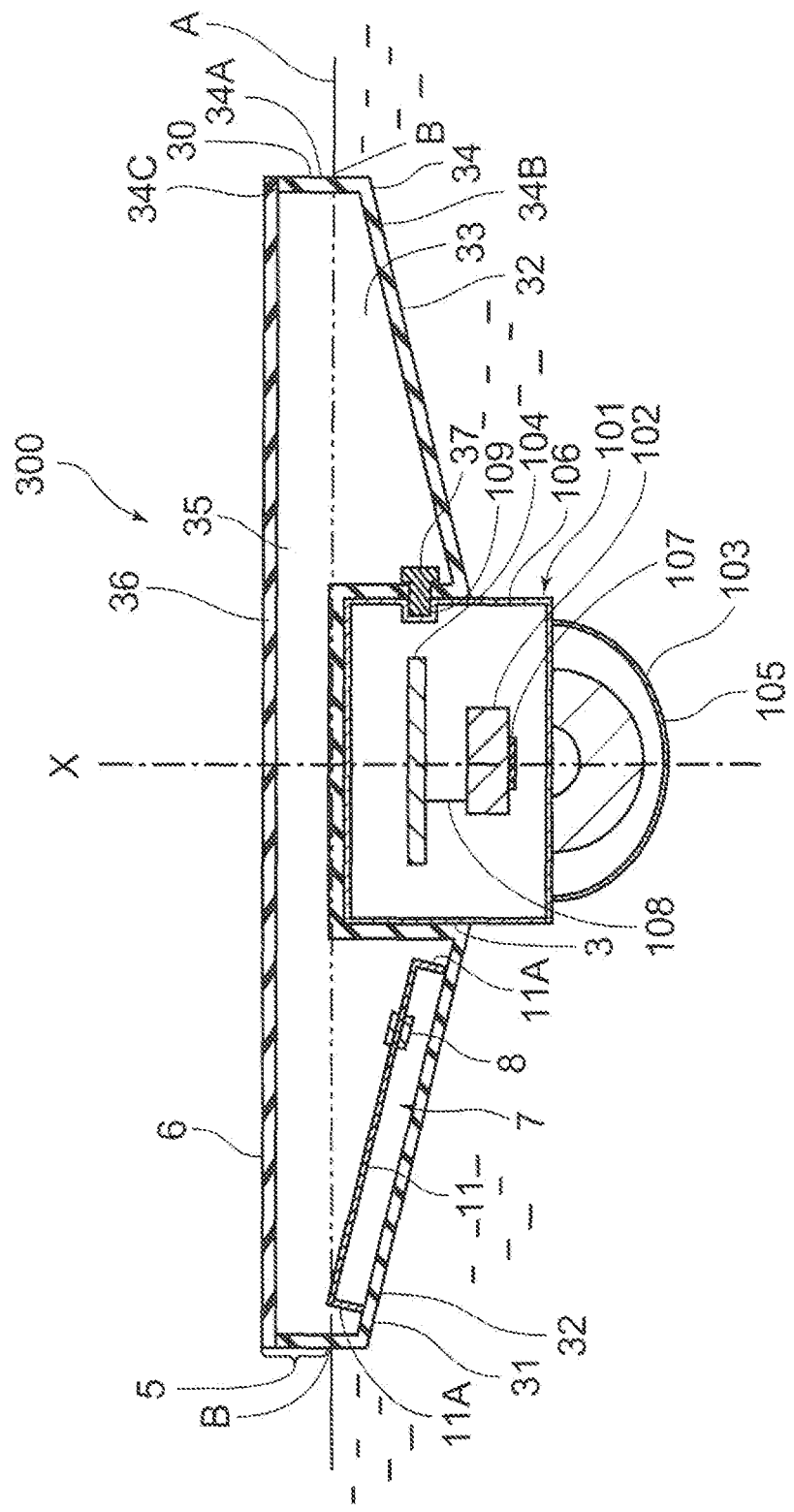
FIG. 10 shows a modified example of the float and the float-included camera apparatus according to the third embodiment.
Figure 11:
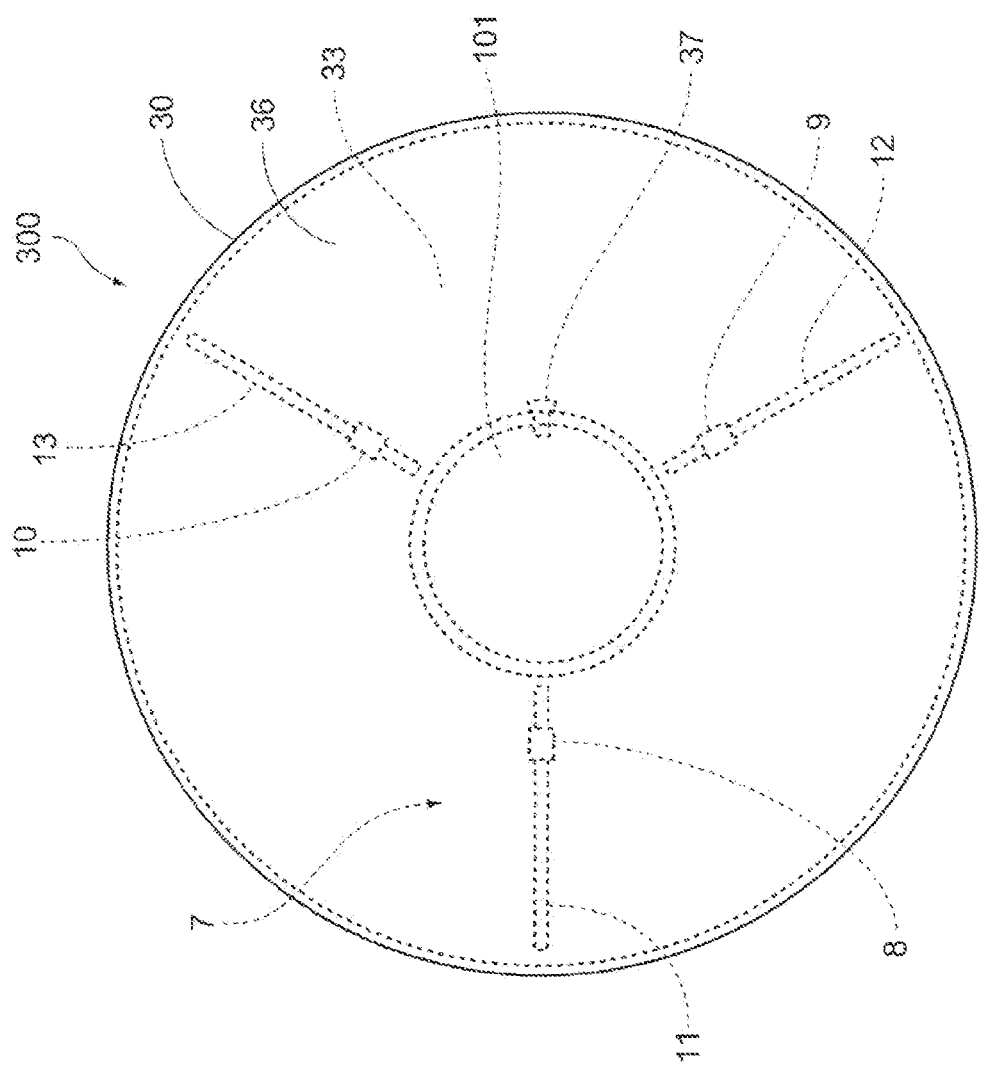
FIG. 11 is a top view of the float-included camera apparatus shown in FIG. 10.

Modified Example of the Float 30 and the Float-Included Camera Apparatus 300 According to the Third Embodiment FIGS. 10 and 11 show a modified example of the float 30 and the float-included camera apparatus 300 according to the third embodiment. FIG. 10 shows a state of floating the float-included camera apparatus 300 on the water's surface A, wherein a schematic configuration of a cross section in a surface comprising the photographing optical axis X is shown. FIG. 11 is a top view of the float-included camera apparatus 300 shown in FIG. 10. The elements that are the same as or similar to the float 1, the float-included camera apparatus 100, the float 30 and the float-included camera apparatus 300 described above are indicated by the same or similar reference numerals and/or letters, and their descriptions are omitted or simplified.

Compared to the described float 30 with solid configurations, the float 30 shown in FIGS. 10 and 11 is configured to have a hollow section 33. An interior of a shell wall 34 is formed to be the hollow section 14. An opening section 35 is formed above the shell wall 34, and the opening section 35 is closed by a cover body 36. The shell wall 34 has a periphery wall section 34A and a bottom wall section 34B. A bottom surface of the bottom wall section 34B forms the conical surface 32. The shell wall 34 and the cover body 36 are formed of a material capable of transmitting a radio wave, such as PET, acrylic resins and etc. The camera device 101 embedded and mounted in the recess 3 is fastened by a screw 37 piercing the shell wall 34 from the interior of the hollow section 33 of the float 30 to the side of the recess 3. A screw hole 109 where the screw 37 screws in is formed in the housing 106 of the camera device 101. Furthermore, the camera device 101 may also be configured by press-fitting into the recess 3.

The cover body 36 is fastened to an upper edge 34C of the periphery wall section 34A by a fastening means such as a snap lock omitted from those shown in the drawings. Furthermore, a waterproof packing omitted from those shown in drawings is provided in a contact section of the cover body 36 and the upper edge 34C, and it is possible to prevent water from penetrating into the hollow section 33 from the opening section 35 when the cover body 36 is fastened to the periphery wall section 34A by the fastening means. Compared to the solid floats, there is air in the hollow section 33, and therefore it is easier to transmit radio waves and increase the buoyancy of the float 30. Furthermore, by means of removing the cover body 36 from the shell wall 34, an operator of the float-included camera apparatus 300 can access the interior of the hollow section 33 from the opening section 35, and can perform the attachment and detachment of the screw 37, the adjustments of the positions of the weights 8, 9 and 10 of the center of gravity shifting mechanism 7.

In the float-included camera apparatus 300 shown in FIGS. 10 and 11, the center of gravity shifting mechanism 7 is equipped in the bottom wall section 34B, and is set to be a configuration arranged in the hollow section 33. However, it is also possible to set the center of gravity shifting mechanism 7 to be a configuration arranged at a top surface 6 (a top surface of the cover body 36) as shown in FIGS. 7 and 8.

Fourth Embodiment

Figure 12:
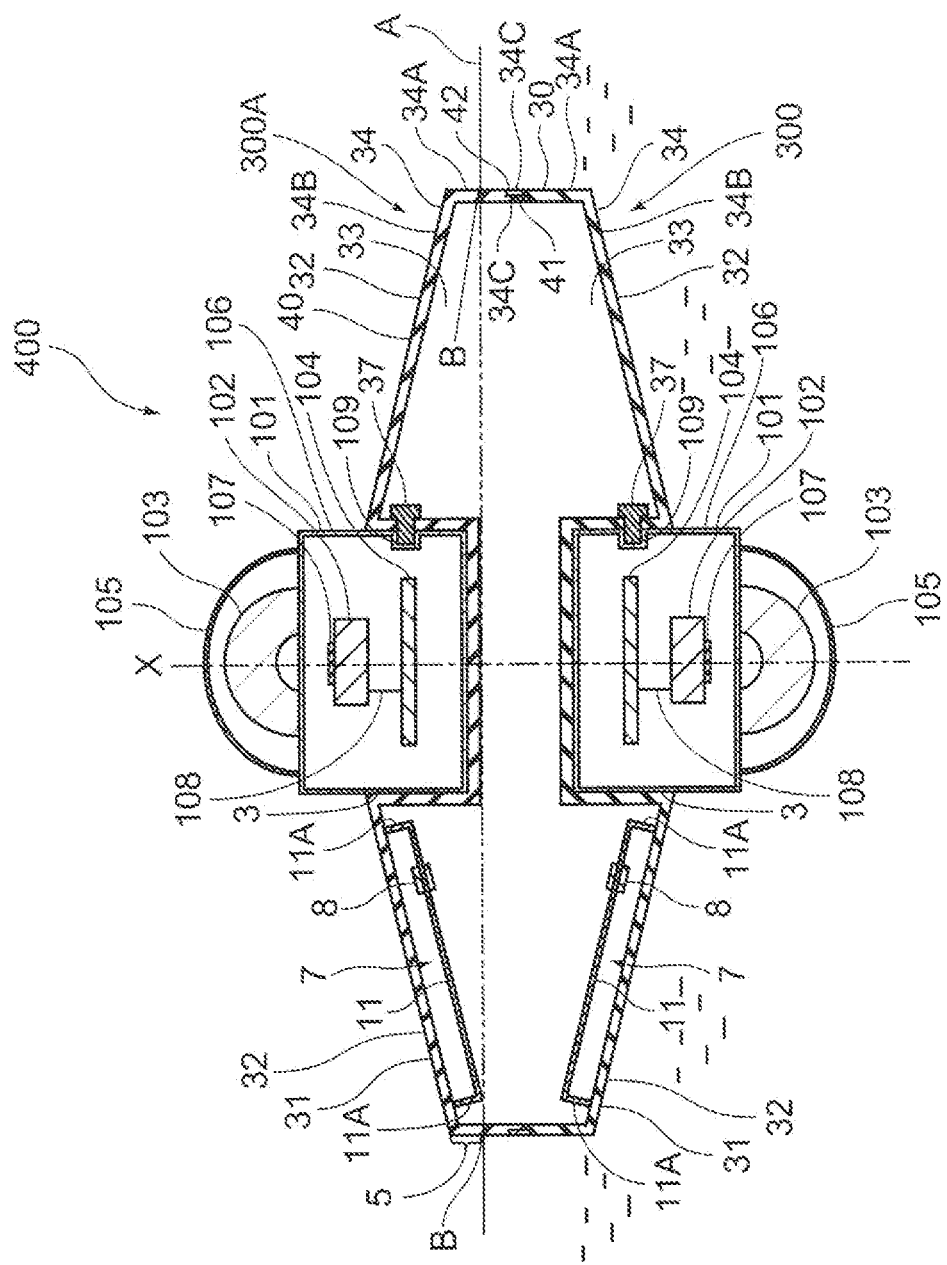
FIG. 12 shows of a modified example of the float and the float-included camera apparatus according to a fourth embodiment.

Next, configurations of a float 40 and a float-included camera apparatus 400 according to the fourth embodiment of the invention are described with reference to FIG. 12. FIG. 12 shows a state of floating the float-included camera apparatus 400 on the water's surface A, schematically showing a cross-sectional configuration of a cross-section comprising a photographing optical axis X. In the subsequent descriptions, elements that are the same as or similar to the float 30 and the float-included camera apparatus 300 according to the third embodiment are indicated by the same or similar reference numerals and/or letters, and their descriptions are omitted or simplified.

The float-included camera apparatus 400 is a configuration equipping a float-included camera apparatus 300A of the same configuration to the float-included camera apparatus 300. The float-included camera apparatus 300A is equipped above the float-included camera apparatus 300 in an upside down reversed state. The float-included camera apparatus 300 and the float-included camera apparatus 300A both have no cover body 36, and are integrally constructed by screwing and connecting female screws 41 formed in the inner circumference of an upper edge 34C of the float-included camera apparatus 300 and male screws 42 formed in the outer circumference of an upper edge 34C (which is an lower edge of the periphery wall section 34A, but is described as the upper edge because it is the component corresponding to the upper edge 34C of the float-included camera apparatus 300) of the float-included camera apparatus 300A with each other. The female screws 41 and the male screws 42 are screwed and connected water-tightly.

The float-included camera apparatus 400 is provided with the camera devices 101 at both the top and the bottom. Therefore, it is possible to photograph both underwater and in the air even when floating the float-included camera apparatus 400 on the water's surface A with the float-included camera apparatus 300 or the float-included camera apparatus 300A disposed at the bottom. Furthermore, the float-included camera apparatus 400 has a symmetrical shape at the top and at the bottom, and the center of gravity thereof is located in the middle of the top and the bottom. Thus, the photographing ranges underwater and in the air are the same when floating the float-included camera apparatus 400 on the water's surface A with any of the float-included camera apparatus 300 and the float-included camera apparatus 300A disposed at the bottom. As a result, it is not necessary to pay attention to what the top and the bottom of the float-included camera apparatus 400 are when floating the float-included camera apparatus 400 on the water's surface.

In the float-included camera apparatus 400, the center of gravity shifting mechanisms 7 are provided for both of the float-included camera apparatus 300 and float-included camera apparatus 30, but it is also possible to only provide the center of gravity shifting mechanism 7 for any one of the float-included camera apparatus 300 and float-included camera apparatus 300A. Furthermore, it also possible to fasten the top surfaces 6 with each other of two of the float-included camera apparatuses 300 comprising the solid floats 30 shown in FIGS. 7 and 8, wherein the center of gravity shifting mechanisms 7 are removed therefrom to form a profile of vertical symmetry.

The float is not limited to the shapes of the floats 1, 20, 30 and 40. The float may also be configured to exhibit any of polygonal cylinders such as cuboids and polygonal pyramids such as quadrangular pyramids. However, it is preferred that the float, overall comprising the part of the recess 3, has a symmetrical shape relative to the photographing optical axis X. It becomes easier to coincide the center of gravity with the photographing optical axis X due to setting the float having a symmetrical shape relative to the photographing optical axis X. As a result, it is easy to dispose the photographing optical axis X along the vertical line.

It is preferred that the shape of the float in a top view (the shape of the cross section perpendicular to the photographing optical axis X) be set as a circle as per floats 1, 20, 30 and 40. Across the complete periphery of the photographing optical axis X of the float, it is possible to identify the moment in the upward or downward direction acting upon the photographing optical axis X as the center due to setting the top view shape to be circle. As a result, the deviation of the photographing range can be decreased.

For example, in a situation in which the top view shape of the float is a polygon, the vertex sections and the edge sections of the polygon have different distances from the photographing optical axis X. Thus, when a tilting force is exerted on the float, the moments are different and the tilting angles are different depending on the tilting force being exerted on the vertex sections or the edge sections. Therefore, sometimes the vertex sections and the edge sections provide different photographing ranges. It is possible to decrease the deviation of the photographing range by means of setting the cross-sectional shape of the float to be circle. Furthermore, the camera device 101 is similar in that it is preferred that it have a shape that is symmetrical relative to the photographing optical axis X. It is easier to coincide the center of gravity of the overall float-included camera apparatus with the photographing optical axis X when mounting the camera device 101 into the float. As a result, it is easy to dispose the photographing optical axis X along the vertical line.

It is preferred that the shape of the camera device 101 in a top view (the shape of the cross section perpendicular to the photographing optical axis X) be set as a circle. The deviation of the photographing range of the overall float-included camera apparatus can be decreased when mounting the camera device 101 into the float. The deviation of the photographing range can be desirably decreased by means of setting the cross-sectional shapes of the float and the camera device 101 to be circle.

In each of described embodiments and the modified examples thereof, the antennas 104 are received in the housings 106, but it is also possible to provide configurations arranging the antenna 104 outside the housing 106.

Fifth Embodiment

Figure 13:
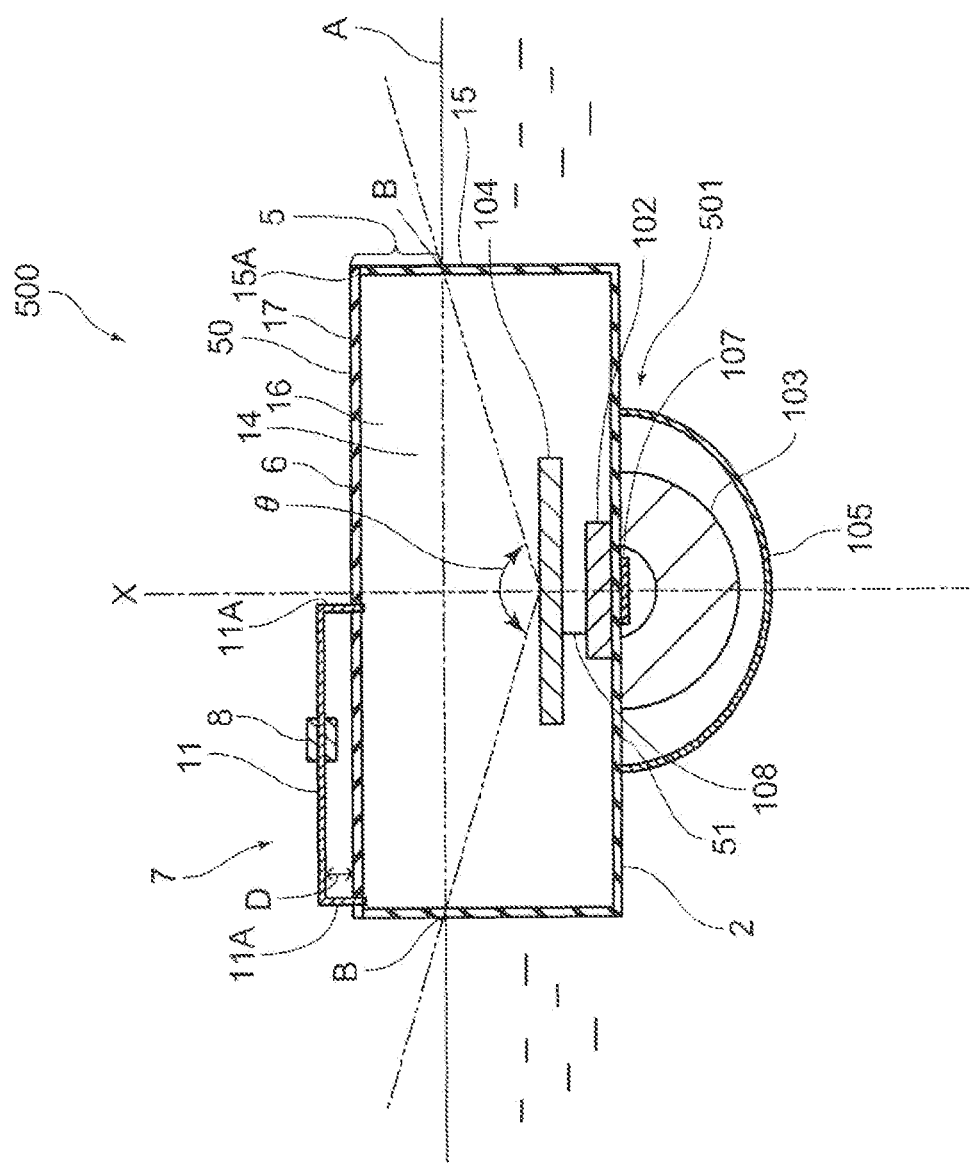
FIG. 13 shows a state of floating a float-included camera apparatus according to a fifth embodiment of the invention on the water's surface, schematically showing a cross-sectional configuration of a cross-section comprising a photographing optical axis.

Next, configurations of a float-included camera apparatus 500 according to the fifth embodiment of the invention are described with reference to FIG. 13. FIG. 13 shows a state of floating the float-included camera apparatus 500 on the water's surface A, schematically showing a cross-sectional configuration of a cross-section comprising a photographing optical axis X. In the subsequent descriptions, elements that are the same as or similar to the float-included camera apparatus 100 shown in FIG. 4 are indicated by the same or similar reference numerals and/or letters, and the descriptions thereof are omitted or simplified.

The float-included camera apparatus 500 comprises a float 50 and a camera device 501. Compared to the float-included camera apparatus 100 whose float 1 and camera device 101 are configured as different components, the camera 501 is configured to be incorporated into the float 50. The float 50 is provided with a flat plane 51 formed in the parts corresponding to the recess 3 of the float 1 in the float-included camera apparatus 100. That is, the bottom surface 2 comprises the flat plane 51 and is formed as a flat plane. Furthermore, an imaging element 107 and a camera lens 103 are provided in the outside surface of the flat plane 51, and a transparent cover 105 for covering the camera lens 103 is further provided.

The camera device 501 is equipped with the camera lens 103 at the outside of the side to be immersed underwater of the float 50. As a result, compared with a situation of providing the camera lens 103 in the float 50, it is possible to decrease the vignetting quantity of the subject light due to the float 50 and etc.

As described, the float 50 has buoyancy to provide a protruding section 5 protruding upwardly from water's surface when the float 50 is floating on the water. Furthermore, the float 50, including the protruding section 5, is formed of a material capable of transmitting a radio wave (for example, PET, acrylic resins and etc.), and it is possible to transmit a radio wave between the protruding section 5 and an antenna 104 arranged in the float 50.

The float-included camera apparatus 500 provides the protruding section 5 protruding upwardly from water's surface A when floating on the water. Thus, the radio waves radiated from the antenna 104 radiate to above the water through the protruding section 5, and furthermore it is possible to send the radio waves radiated from an operation device (not shown) above the water to the antenna 104 through the protruding section 5 even when the antenna 104 is located under the water's surface A. Therefore, it is unnecessary for the float-included camera apparatus 500 to be equipped with the antenna 104 above the water's surface A. That is, the float 50 can decrease the limitations to the arrangement of the antenna 104.

The float 50 configured as described above can send radio waves to and receive radio waves from above the water's surface A even if the antenna 104 is disposed under the water's surface A. Therefore, it is possible to dispose the antenna 104 under the water's surface A, and it is possible to decrease the height of the camera device 101. Thus, the float-included camera apparatus 500 can be configured to lower the center of gravity thereof, and can stabilize a position against waves and etc. when floating on the water's surface A.

With the antenna 104, it is easy to send and receive radio waves inside (at an interior side of) an angular range of an angle θ formed by a waterline position B, coming in contact with the water's surface A, of the float 1, and the antenna 104. On the other hand, it is difficult to send and receive radio waves outside (at the exterior of) the angular range of the angle θ due to water presenting at the path from the antenna 104 to above the water's surface A. Therefore, it is possible to set the angle θ to be the desired value by means of properly setting the horizontal size of the float 50 (the diameter of the float 50), the position of the antenna 104 relative to the water's surface A along an upward, downward, or other direction. The angle θ is set to be easy for the communication of the camera device 501 and the operation device (not shown).

Sixth Embodiment

Figure 14:
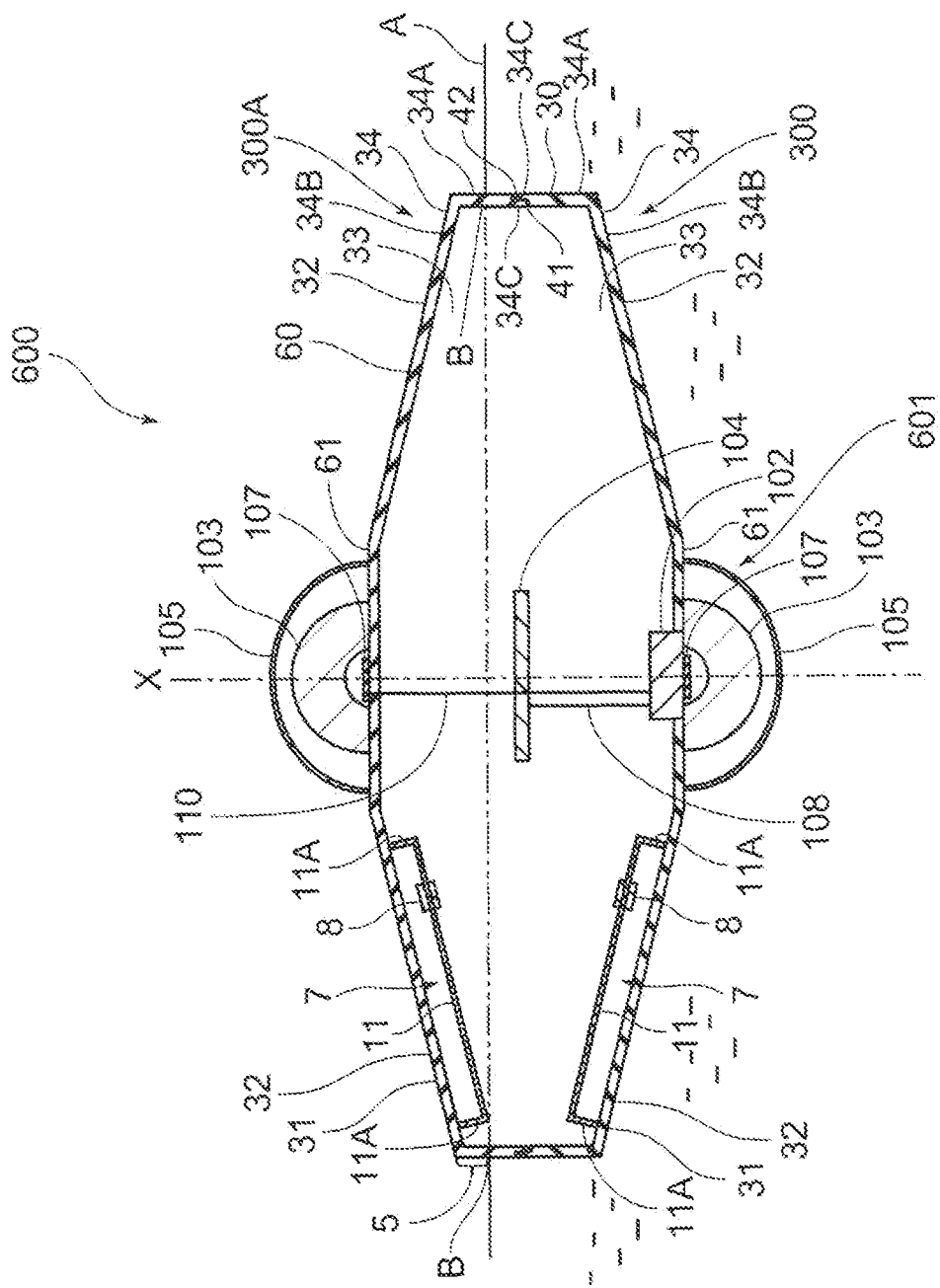
FIG. 14 shows a state of floating a float-included camera apparatus according to a sixth embodiment of the invention on the water's surface, schematically showing a cross-sectional configuration of a cross-section comprising a photographing optical axis.

Next, configurations of a float-included camera apparatus 600 according to the sixth embodiment of the invention are described with reference to FIG. 14. FIG. 13 shows a state of floating the float-included camera apparatus 600 on the water's surface A, schematically showing a cross-sectional configuration of a cross-section comprising a photographing optical axis X. In the subsequent descriptions, elements that are the same as or similar to the float-included camera apparatus 400 are indicated by the same or similar reference numerals and/or letters, and their descriptions are omitted or simplified.

The float-included camera apparatus 600 comprises a float 60 and a camera device 601. Compared to the float-included camera apparatus 400 whose float 40 and camera device 101 are configured as different components, the camera 601 is configured to be incorporated into the float 60. The float 60 is provided with a flat plane 61 formed in the parts corresponding to the recess 3 of the float 40 in the float-included camera apparatus 400. Furthermore, an imaging element 107 and a camera lens 103 are provided in the outside surface of the flat plane 61, and a transparent cover 105 for covering the camera lens 103 is further provided.

The camera device 601 is provided with the camera lenses 103 and the imaging elements 107 respectively at the top and the bottom. A circuit component 102 and an antenna 104 are provided commonly for the imaging elements 107 at the top and the bottom. One of the imaging elements 107 is coupled to the circuit component 102 by a communication line 110. That is, the imaging element 107 coupled to the circuit component 102 by the communication line 110 is coupled to the antenna 104 through the communication line 108 coupling the other imaging element 107 and the antenna 104. The float-included camera apparatus 600 are provided with the camera devices 601 comprising the imaging elements 107 and the camera lenses 103 at the top and the bottom. Therefore, it is possible to photograph both underwater and in the air even when floating the float-included camera apparatus 600 on the water's surface A with any of the imaging elements 107 disposed at the bottom. Furthermore, the float-included camera apparatus 600 has a symmetrical shape at the top and at the bottom, the center of gravity thereof is located in the middle of the top and the bottom, and the antenna 104 is arranged at the position of the center of gravity, similar to the float-included camera apparatus 400 described above. Thus, the photographing ranges underwater or in the air are the same when floating the float-included camera apparatus 600 on the water's surface A with any of the imaging elements 107 disposed at the top or at the bottom. As a result, it is not necessary to pay attention to what the top and the bottom of the float-included camera apparatus 600 are when floating the float-included camera apparatus 600 on the water's surface.

The camera lenses 103 are disposed at the outsides of the flat plane 61, namely, at the outsides at the top and at the bottom of the float 60. As a result, compared with the situation of providing the camera lens 103 in the float 60, it is possible to decrease the vignetting quantity of the subject light due to the float 60.

The floats 1, 20, 30, 50 and 60 or the float-included camera apparatuses 100, 200, 300, 400, 500 and 600 described above may also be set to be a configuration comprising a propulsion device. The float-included camera apparatuses 100, 200, 300, 400, 500 and 600 can be driven to move on the water by the propulsion device. It is preferred to compose the propulsion device so as to be capable of remotely controlling the propulsion power and the moving directions. The propulsion power of the propulsion device can be generated by rotation of the driving source such as motors which are lead screws arranged underwater, propellers arranged in the air, for example.

While the invention has been described by way of example and in terms of preferred embodiment, it should be understood that the invention is not limited thereto. On the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. A camera apparatus, comprising:
    a float capable of floating on surface, the float having a protruding section on the surface, the immersed section comprising a storage space; and
    a camera device comprising a lens received in the storage space and an antenna equipped inside the camera device relatively to the lens, wherein the antenna is close to the surface, and the camera apparatus is capable of performing underwater communication, wherein the protruding section and a portion between the antenna and the protruding section are composed of a material capable of transmitting radio waves.

2. The camera apparatus as claimed in claim 1, wherein lines extending from the antenna respectively upwardly to waterline positions at vertical surfaces at either side of the float form an angle (θ);
    the antenna is capable of sending and receiving the radio waves inside an angular range of the angle (θ) ranging as 0<θ<180 degrees; and
    the angle (θ) increases when a lateral diameter of the float or a reciprocal of a vertical distance from the antenna upwardly to the water's surface increases.

3. The camera apparatus as claimed in claim 1, wherein a hole section penetrating from the immersed section to an exterior of the protruding section is formed in the float.

4. The camera apparatus as claimed in claim 1, wherein the float has a tapering section below the water's surface, the tapering section tapering along a direction from top to bottom while floating on the water's surface, wherein; the immersed section is arranged at a position comprising a lower end of the tapering section.

5. The float as claimed in claim 4, wherein a reflex angle of an apex angle formed by side surfaces of the tapering section is equal to or greater than an angle of view of the camera device.

6. The camera apparatus as claimed in claim 1, wherein the float has a center of gravity shifting mechanism capable of moving a weight between a center side and an outside of the float.

7. The camera apparatus as claimed in claim 1, wherein the float has a shape that is symmetrical between top and bottom of the float, the float further comprises a second storage space at top of the float, and the storage space is provided for mounting a second lens.

8. A camera apparatus, comprising:
    a float capable of floating on surface, the float having a protruding section on the surface, the immersed section comprising a storage space; and
    a camera device comprising a lens received in the storage space and an antenna equipped inside the camera device relatively to the lens, wherein the antenna is close to the surface, and the camera apparatus is capable of performing underwater communication,
    wherein the float has a tapering section below the water's surface, the tapering section tapering along a direction from top to bottom while floating on the water's surface, wherein;
    the immersed section is arranged at a position comprising a lower end of the tapering section.

9. The camera apparatus as claimed in claim 8, wherein a hole section penetrating from the immersed section to an exterior of the protruding section is formed in the float.

10. The camera apparatus as claimed in claim 8, wherein the float has a shape that is symmetrical between top and bottom of the float, the float further comprises a second storage space at top of the float, and the storage space is provided for mounting a second lens.

11. A camera apparatus, comprising:
    a float capable of floating on surface, the float having a protruding section on the surface, the immersed section comprising a storage space; and
    a camera device comprising a lens received in the storage space and an antenna equipped inside the camera device relatively to the lens, wherein the antenna is close to the surface, and the camera apparatus is capable of performing underwater communication,
    wherein the float has a center of gravity shifting mechanism capable of moving a weight between a center side and an outside of the float.

12. The camera apparatus as claimed in claim 11, wherein a hole section penetrating from the immersed section to an exterior of the protruding section is formed in the float.

13. The camera apparatus as claimed in claim 11, wherein the float has a shape that is symmetrical between top and bottom of the float, the float further comprises a second storage space at top of the float, and the storage space is provided for mounting a second lens.

\* \* \* \* \*